United States Patent [19]

Blackburn et al.

[11] Patent Number: 5,722,686
[45] Date of Patent: Mar. 3, 1998

[54] METHOD AND APPARATUS FOR SENSING AN OCCUPANT POSITION USING CAPACITANCE SENSING

[75] Inventors: Brian K. Blackburn, Rochester; Scott B. Gentry, Romeo; Joseph F. Mazur; Charles E. Steffens, Jr., both of Washington; John E. Bessonen, Redford; William M. Jarocha, South Lyon, all of Mich.

[73] Assignee: TRW Vehicle Safety Systems, Inc., Lyndhurst, Ohio

[21] Appl. No.: 442,190

[22] Filed: May 16, 1995

[51] Int. Cl.$^6$ .................................................. B60R 21/32
[52] U.S. Cl. ........................... 280/735; 280/731; 340/562
[58] Field of Search ........................ 280/735, 731, 280/736; 307/10.1; 340/562

[56] References Cited

U.S. PATENT DOCUMENTS

| | | | |
|---|---|---|---|
| 4,572,207 | 2/1986 | Yoshimi et al. | 128/706 |
| 4,796,013 | 1/1989 | Yasuda et al. | 340/562 |
| 5,074,583 | 12/1991 | Fujita et al. | 280/735 |
| 5,330,226 | 7/1994 | Gentry et al. | 280/735 |
| 5,411,289 | 5/1995 | Smith et al. | 280/735 |
| 5,525,843 | 6/1996 | Howing | 280/735 |

*Primary Examiner*—Paul N. Dickson
*Attorney, Agent, or Firm*—Tarolli, Sundheim, Covell, Tummino & Szabo

[57] ABSTRACT

An apparatus for controlling an actuatable restraint system (20) in response to a sensed position of an occupant (36) in an occupant compartment of a vehicle includes a variable capacitor (60) mounted relative to a known reference location (30) within the vehicle. The variable capacitor (60) is adapted so that its capacitance value is functionally related to the occupant's position relative to the reference location (30). A controller (50) is coupled to a capacitance sensing circuit (80) for controlling the actuatable restraint (22) in response to the sensed occupant position relative to the reference location.

58 Claims, 4 Drawing Sheets

METHOD AND APPARATUS FOR SENSING AN OCCUPANT POSITION USING CAPACITANCE SENSING

TECHNICAL FIELD

The present invention is directed to a vehicle occupant restraint system and is particularly directed to a method and apparatus for sensing an occupant position for the purpose of controlling an air bag restraint system.

BACKGROUND OF THE INVENTION

Vehicle occupant restraint systems having an actuatable restraining device are well known in the art. One particular type of actuatable restraining device includes an inflatable air bag mounted to inflate within the occupant compartment of the vehicle. The air bag has an associated, electrically actuatable igniter, referred to as a squib.

Such occupant restraint systems further include a crash sensor for sensing the occurrence of a vehicle crash condition and for providing an electrical signal indicative of the crash condition. When the crash sensor indicates that the vehicle is in a crash condition requiring inflation of the air bag to help protect a vehicle occupant, an electric current of sufficient magnitude and duration is passed through the squib for the purpose of igniting the squib. The squib, when ignited, ignites a combustible gas generating composition and/or opens a container of pressurized gas operatively coupled to the air bag, which results in inflation of the air bag.

Several patents have proposed control of an inflatable restraint in response to the sensed position of the vehicle occupant. To sense the position of the occupant, such systems include ultrasonic sensors, infrared sensors, and/or seat sensors to detect the occupant's position. In response to the sensed occupant position, air bag pressure, timing of air bag deployment, and aiming of the air bag are controlled.

SUMMARY OF THE INVENTION

The present invention provides a method and apparatus for sensing an occupant's position using capacitance sensing. The apparatus includes a variable capacitor. The capacitance value is functionally related to the occupant's position relative to a reference location. An air bag is controlled in response to the sensed occupant's position as determined from the capacitance value.

In accordance with the present invention, an apparatus is provided for detecting the position of an occupant in an occupant compartment of a vehicle. The apparatus comprises a variable capacitor mounted at a position relative to a predetermined reference location within the vehicle. The variable capacitor has spaced apart conductive plates and a dielectric effectively located between the conductive plates. The capacitance value of the variable capacitor varies as a function of the value of the dielectric. The conductive plates are adapted so that the occupant is an effective part of the dielectric. The dielectric value varies as a function of the occupant location relative to the spaced apart conductive plates. Capacitance sensing circuit means senses the capacitance value of the variable capacitor and outputs an electric signal indicative of the sensed capacitance value, the sensed capacitance value being indicative of the occupant's position relative to the reference location. Control means is operatively coupled to the capacitance sensing circuit means for generating an electric control signal in response to the electric signal from the capacitance sensing circuit means.

In accordance with another embodiment of the present invention, an apparatus is provided for controlling an actuatable restraint system in response to a sensed occupant seating characteristic. The apparatus comprises a variable capacitor mounted at a known reference location within the vehicle. The variable capacitor is adapted so that the capacitance value of the variable capacitor varies as a function of the occupant's position. Capacitance sensing circuit means senses the capacitance value of the capacitor and outputs an electric signal indicative of the sensed capacitance value. Control means is operatively coupled to the capacitance sensing circuit means for controlling the actuatable restraint in response to the signal from the capacitance sensing circuit means.

In accordance with a further embodiment of the present invention, an apparatus is provided for detecting the position of an occupant in an occupant compartment of a vehicle. The apparatus comprises a variable capacitor mounted at a known reference location within the vehicle. The variable capacitor has a capacitive sensing electrode mounted at the reference location. The vehicle occupant is capacitively coupled to the capacitive sensing electrode so that the capacitance value of the variable capacitor varies as a function of the occupant location relative to the reference location. The apparatus further comprises capacitance sensing circuit means for sensing the capacitance value of the variable capacitor and outputting an electric signal indicative of the sensed capacitance value, the sensed capacitance value being indicative of the occupant's position relative to the reference location. Control means is operatively coupled to the capacitance sensing circuit means for generating an electric control signal in response to the electric signal from the capacitance sensing circuit means.

In accordance with another embodiment of the present invention, a method for detecting an occupant seating characteristic in an occupant compartment of a vehicle comprises the steps of applying an oscillating voltage to two spaced apart conductive plates and mounting the conductive plates relative to a known reference location so that the occupant is effectively part of a dielectric between the conductive plates. The dielectric value varies as a function of the occupant seating characteristic. The method further comprises the steps of sensing the capacitance value of the variable capacitor and outputting an electric signal indicative of the sensed capacitance value, the sensed capacitance value being indicative of the occupant's seating characteristic. The method further includes the step of providing an electric control signal in response to the sensed capacitance value.

In accordance another embodiment of the present invention, a method is provided for controlling an actuatable restraint system in response to a sensed occupant seating characteristic. The method comprises the steps of mounting spaced apart electrodes in the vehicle compartment so as to form a variable capacitor. The capacitance value of the variable capacitor varies as a function of the value of a dielectric between the spaced apart electrodes. The capacitor is mounted so that the occupant is effectively part of the dielectric. The value of the dielectric varies as a function of the occupant's seating characteristic. The method further comprises the steps of sensing the capacitance value of the capacitor and outputting an electric signal indicative of the sensed capacitance value, the capacitance value being indicative of the occupant's seating characteristic, and controlling the actuatable restraint in response to the sensed capacitance value.

In accordance with a still further embodiment of the present invention, a method is provided for controlling an actuatable restraint system in response to a sensed occupant seating characteristic. The method comprising the steps of mounting a variable capacitor in the vehicle relative to a reference location and adapting the variable capacitor so that its capacitance value is functionally related to the occupant's seating characteristic. The capacitance value of said capacitor is sensed, and an electric signal is output indicative of the sensed capacitance value. The actuatable restraint is controlled in response to the sensed capacitance value.

In accordance with another embodiment of the present invention, a method is provided for detecting an occupant seating characteristic in an occupant compartment of a vehicle. The method comprises the steps of mounting a first conductive electrode of a variable capacitor at a reference location, the first conductive electrode forming a capacitance sensing electrode of the variable capacitor. The method further comprises the steps of capacitively coupling the occupant to the capacitance sensing electrode so that the capacitance value of the variable capacitor varies as a function of the occupant's seating characteristic. The capacitance value of the variable capacitor is sensed and an electric signal is output indicating the sensed capacitance value. A control signal is provided in response to the sensed capacitance value.

BRIEF DESCRIPTION OF THE DRAWINGS

Other features and advantages of the present invention will become apparent to those skilled in the art to which the present invention relates from a reading of the following detailed description of preferred embodiments with reference to the accompanying drawings, in which.

DESCRIPTION OF PREFERRED EMBODIMENTS

Figure 1:
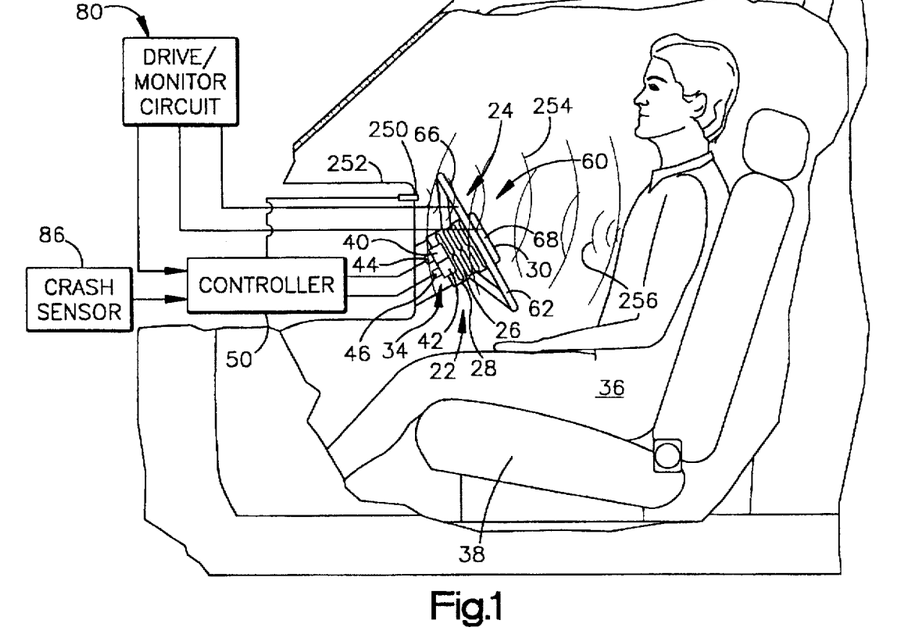
FIG. 1 is a schematic diagram of a vehicle restraint system including an occupant position sensing apparatus made in accordance with the present invention.
Figure 2:
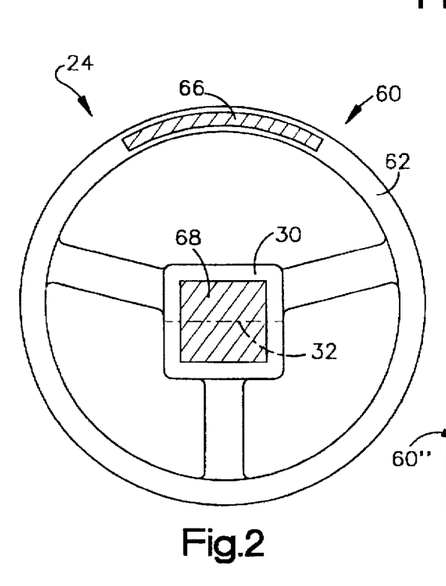
FIG. 2 is a schematic diagram of the vehicle steering wheel of FIG. 1 showing spaced apart capacitor plates in accordance with one embodiment of the invention.

Referring to FIGS. 1 and 2, an occupant restraint system 20 includes air bag assembly 22 mounted in a steering wheel assembly 24 of a vehicle. Although the invention is described with regard to FIGS. 1 and 2 as a driver's side air bag, those skilled in the art will appreciate that the invention is also applicable to a passenger's side restraint system. The air bag assembly 22 includes an air bag 26 folded and stored on a suitable support as is known in the art. A cover 30 on the occupant facing portion of the steering wheel assembly 24 covers the stored air bag and is adapted to open easily upon inflation of the air bag 26. As is known in the art, the cover 30 opens at a tear seam 32.

A source 34 of inflation fluid, such as an inert gas, is operatively connected to the air bag 26. inflation fluid from the source 34, which may be generated by combustion of pyrotechnic material and/or released from a pressurized container, fills the air bag 26 to its inflated condition. Once inflated, as occurs during a vehicle crash, the air bag 26 helps protect an occupant 36 sitting on a vehicle seat 38 from forcefully striking parts of the vehicle interior such as the steering wheel assembly 24.

The source 34 of inflation fluid preferably includes, in accordance with one embodiment of the present invention, two separate inflation fluid sources, such as two bodies of pyrotechnic gas generating material 40, 42, operatively connected to the air bag 26. Each of the bodies of gas generating material 40, 42 has an associated igniter 44, 46, respectively, referred to as a squib. This type of air bag assembly 22 is referred to as a dual stage inflator assembly. By controlling ignition of either one or both of the bodies of gas generating material 40, 42, pressure in the air bag 26 can be controlled. A low level of inflation occurs when only one of the bodies of gas generating material is ignited. A high level of inflation occurs when both of the bodies of gas generating material are ignited. If the two bodies of gas generating material 40, 42 are not equal in gas generating capacity, three levels of inflation can be achieved by igniting one or the other bodies of gas generating material 40, 42, or both bodies of gas generating material 40, 42. Also, timing of deployment and timing between actuation of the different stages can be controlled. In accordance with the present invention, control of the air bag inflation level during a deployment crash condition and control of the timing of actuation of the different stages are responsive to the sensed position of the occupant 36 relative to the air bag assembly 22.

An electronic controller 50, such as a microcomputer, is operatively connected to the two igniters 44, 46. The controller 50 controls inflation of the air bag 26 to one of several discrete levels through control of the igniters 44, 46 in response to the sensed position of the occupant 36. To sense the position of the occupant, in accordance with the present invention, a variable capacitor 60 is operatively mounted in the vehicle steering wheel assembly 24.

Specifically, the variable capacitor 60 includes spaced apart capacitor plates 66, 68. Preferably, the plate 66 is mounted in the rim or hand-wheel portion 62 of the steering wheel assembly 24, and the plate 68 is mounted in the air bag cover 30. Although members 66, 68 are referred to as capacitor plates, they are preferably made of conductive foil. In particular, the plate 68 is made of a foil embedded in the plastic material of the air bag cover 30 and includes a tear seam aligned with the tear seam 32. When the air bag 26 inflates, the foil 68 easily tears.

As is well known in the art, the capacitance value of a capacitor is functionally related to the dielectric constant of the material effectively between the two plates that form the capacitor. The effective dielectric between the two plates 66, 68 (assuming the occupant 36 is fully seated against the back of the seat 38) is the air between the two plates. As the occupant moves forward in the seat toward the plates 66, 68, he becomes effectively part of the dielectric. The presence of the occupant effectively increases the dielectric constant between the plates. The closer the occupant is to the plates 66, 68, the greater the value of the effective dielectric. As the dielectric value increases, the capacitance value increases. By measuring the change in the capacitance value, the position of the occupant can be determined. Once the occupant's position is known relative to the air bag assembly 22, the controller 50 can control the inflation level of the air bag 26 should a crash condition be detected which requires inflation of the air bag to protect the occupant 36.

Drive/monitor circuit 80 is operatively connected to the capacitor plates 66, 68. The drive/monitor circuit 80 measures the capacitance value of the capacitor 60 and outputs a signal to controller 50 indicative of the capacitance value. It is possible to use a single drive/monitor circuit 80 for both a driver's side and a passenger's side restraint with the circuit 80 being switched between the two. The controller 50 would set associated internal flags to control the appropriate igniters for the monitored capacitors.

Controller 50 is further connected to a crash sensor 86. The crash sensor 86 can be any one of several known crash sensors. For example, the crash sensor 86 may be an inertia switch having normally open electrical contacts. Upon the occurrence of a deployment crash condition, i.e., one in which it is desirable to inflate the air bag, the normally open electrical contacts close. When the controller 50 senses the switch closure, it actuates the squibs 44 and 46.

The crash sensor 86 may also be an accelerometer which, upon the occurrence of a crash condition, outputs an electric signal having a characteristic indicative of the crash condition. The controller 50 evaluates the accelerometer output signal in accordance with any one or more crash algorithms known in the art. Typically, such algorithms are based on crash acceleration, the integral of crash acceleration, i.e., crash velocity, the double integral of crash acceleration, i.e., crash displacement, and/or the derivative of crash acceleration, i.e., crash jerk.

Figure 3:
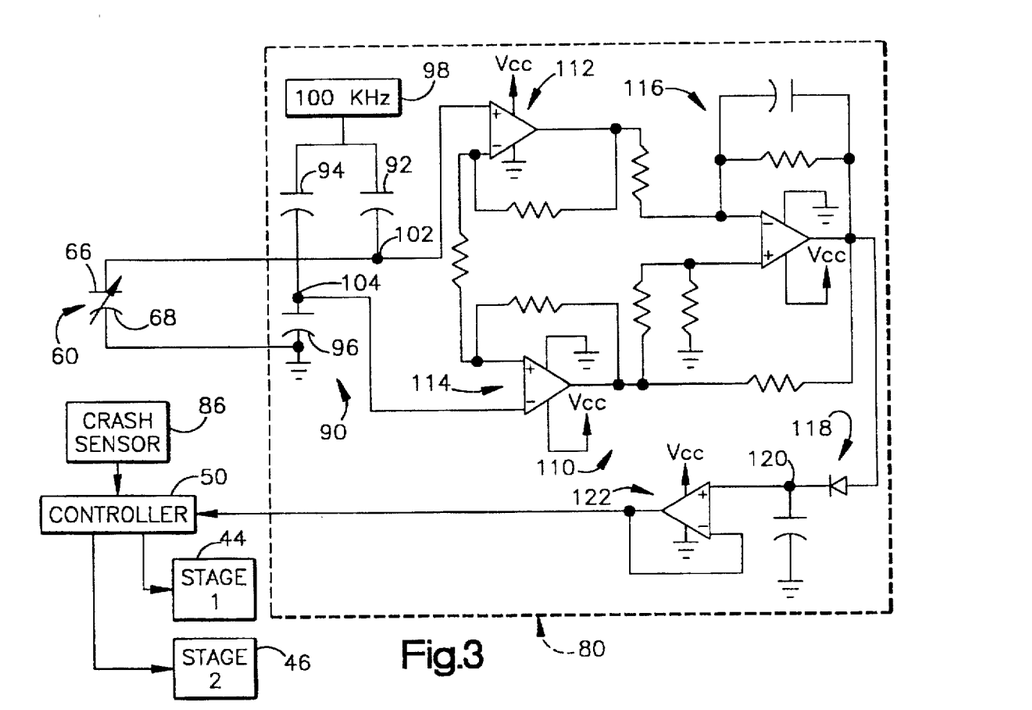
FIG. 3 is a schematic diagram showing the drive/monitor circuit of FIG. 1 in greater detail.

Referring to FIG. 3, the operation of the drive/monitor circuit 80 will be better appreciated. The variable capacitor 60 is connected in a capacitor Wheatstone bridge circuit 90. The bridge circuit 90 includes a fixed capacitor 92 connected in series with capacitor 60. Series connected fixed capacitors 94, 96 are connected in parallel with capacitors 92, 60. The bridge circuit 90 is operatively connected to an oscillating drive source 98 that applies an oscillating signal to the bridge. Preferably, the drive signal is approximately at 100 kHz.

Junction 102 between capacitors 92 and 60 and junction 104 between capacitors 94 and 96 are operatively connected to a differential measuring circuit 110. The differential measuring circuit 110 includes amplifier circuits 112, 114 connected to the junctions 102, 104, respectively. The outputs of amplifier circuits 112, 114 are connected to an integrator circuit 116. The output of circuit 116 is connected to a rectifier circuit 118 having a diode and capacitor. The signal at diode/capacitor junction 120 of rectifier circuit 118 is an analog signal having a voltage value indicative of the capacitance value of capacitor 60. This voltage value at junction 120 is connected to controller 50 through a voltage follower circuit 122. This voltage value is indicative of the occupant's position relative to the steering wheel rim 62 and, in turn, relative to the air bag assembly 22.

Figure 4:
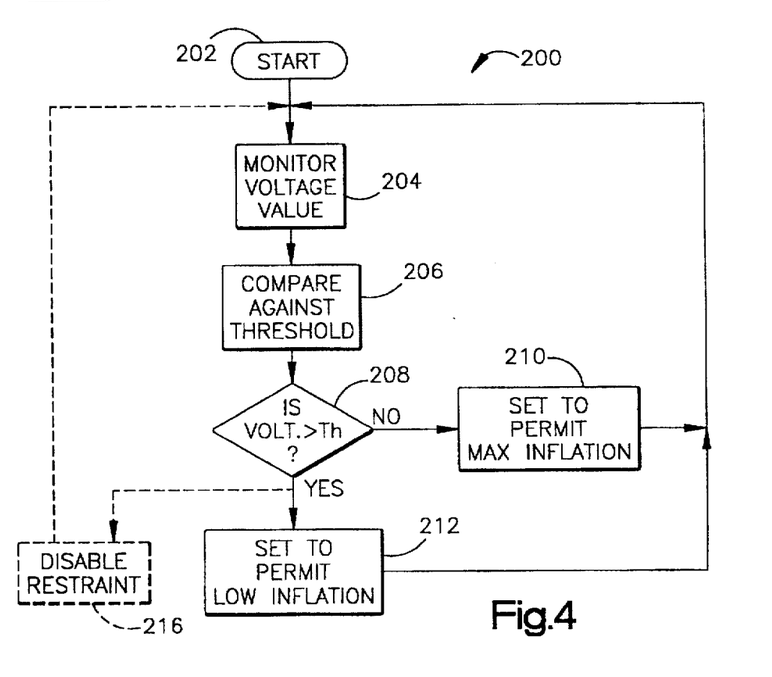
FIG. 4 is a flow chart diagram showing a process for controlling a portion of the system of FIG. 1 in accordance with one embodiment of the present invention.

Referring to FIG. 4, the control process 200 used by the controller 50 will be appreciated. This control process assumes a two stage inflator assembly in which the inflation options are for either or both of the inflator fluid sources to be controlled in response to the determined occupant's position relative to the air bag assembly 22. The process starts at step 202 when the vehicle engine is started. In step 202, initial conditions are set, flags set, memory checked, etc., as is well known in the art. The process then proceeds to step 204 where the voltage output from voltage follower 122, in other words, from the drive/monitor circuit 80, is monitored. In step 206, the monitored voltage value is compared against a predetermined threshold value.

In accordance with this embodiment of the present invention in which two inflation levels are possible, the controller monitors the capacitance value, i.e., the occupant's position relative to the air bag assembly, and functions as a switch. If the occupant is greater than a predetermined distance, e.g., four inches, from the air bag assembly, maximum inflation level is permitted (both inflator fluid sources are actuated) upon the occurrence of a deployment crash condition. If the occupant is at the predetermined distance or closer, a low inflation level is permitted (only one inflator fluid source is actuated) upon the occurrence of a deployment crash condition.

The process proceeds to step 208 where a determination is made as to whether the voltage value monitored in step 206 is greater than a predetermined threshold value "Th." This threshold value Th is indicative of the occupant being at the predetermined distance from the air bag assembly. If the determination in step 208 is negative, i.e., the occupant is farther than the predetermined distance from the air bag assembly, the process proceeds to step 210 where the controller 50 sets an internal flag that will permit maximum inflation to occur should a deployment crash condition be detected. If the determination in step 208 is affirmative, i.e., the occupant is equal to or less than the predetermined distance from the air bag assembly, the process proceeds to step 212 where the controller 50 sets an internal flag that will permit low inflation to occur should a deployment crash condition be detected. From either step 210 or step 212, the process loops back to step 204. As will be appreciated, the process shown in FIG. 4 is a continuous process that permits a change in the permissible inflation level of the air bag in response to a change in the occupant's position.

In this embodiment, setting the system in step 210 to permit maximum inflation does not mean that both inflators have to be simultaneously actuated upon the occurrence of a deployment crash condition. In response to the occupant's sensed position, it may be desirable to actuate one of the igniters followed by ignition of the other igniter a predetermined time later.

An alternative embodiment is also shown in FIG. 4 for use in an air bag restraint system having only one inflation fluid source. In accordance with this embodiment, inflation will either be permitted if a deployment crash condition occurs or be disabled. If the determination in step 208 is negative, i.e., the occupant is further than the predetermined distance from the air bag assembly, the process proceeds to step 210 where a flag is set that will permit inflation should a deployment crash condition occur. If the determination in step 208 is affirmative, the process proceeds to step 216 where a flag is set that will disable the restraint, i.e., not permit inflation should a deployment crash condition occur. From either step 210 or step 216, the process loops back to step 204.

In accordance with another embodiment of the present invention for a passenger's side restraint system, the capacitive sensor 60 senses whether an occupant is or is not present in addition to sensing position when an occupant is present. If the capacitance sensor indicates that no occupant is present, actuation of the restraint is disabled. The process would then loop back to step 204.

Those skilled in the art will appreciate that the drive/monitor circuit 80 and controller 50 can be tuned so as to be insensitive to smaller parts of an occupant's body, e.g., hands, passing in front of the air bag assembly. Preferably, the controller 50 will include a digital filter arrangement to filter out short duration movement of the occupant in front of the steering wheel. Also, the dielectric effect of the occupant's upper body and head is different than the dielectric effect of the occupant's hands or arms.

Referring to FIG. 1, the capacitive sensing arrangement, in accordance with the present invention, may also be used in combination with other occupant position sensing devices. For example, an ultrasonic sensor 250 is mounted in the instrument panel 252 and is electrically connected to controller 50. The controller 50 triggers the ultrasonic sensor 250 to produce an ultrasonic pulse 254. When the ultrasonic pulse 254 strikes the occupant 36, a reflected pulse 256 is returned to the ultrasonic sensor 250. The ultrasonic sensor 250 provides an electric signal indicative of the receipt of a reflected or echo pulse 256 to the controller 50. The controller 50 determines the time between transmission of the pulse 254 and receipt of the echo pulse 256. From this time differential, the controller 50 calculates the distance between (a) the sensor 250 and, as will be explained, the stored air bag 26 and (b) the occupant 36. The front cover 30 of the air bag is used by controller 50 as a reference location within the occupant compartment. The distance between the ultrasonic sensor and the front cover 30 is known. Since this distance is known, the controller can use the ultrasonic distance determination to determined the distance from the air bag cover to the occupant.

As an alternative to the use of an ultrasonic sensor, an active infrared sensor may be used. In an active infrared sensor, a pulsed infrared ray from an LED (light emitting diode) is produced. An infrared receiver or monitoring lens monitors for a reflection of the transmitted infrared pulsed ray. Such an active infrared sensor is manufactured by Hamamatsu Photonics K.K., Solid State Division, of Hamamatsu City, Japan, under part No. H2476-01. U.S. Pat. No. 5,330,226 to Gentry et al., assigned to TRW Vehicle Safety System Inc., includes other alternatives for occupant position sensing.

In accordance with this embodiment of the present invention, the controller 50 uses the ultrasonic sensor 250 as one occupant position sensor. The controller 50 uses the capacitive sensor as a second occupant position sensor. One sensor can be used as the primary sensor and the other as a secondary sensor used for verification. In accordance with a preferred embodiment, the flag to limit inflation level to a lower level or the flag to disable the air bag inflation is set only after capacitance sensor indicates that the occupant's position is within a predetermined position of the air bag assembly, e.g., within four inches of the front cover 30.

The capacitive sensor of the present invention can also be used in combination with other air bag control arrangements such as those that control inflation level in response to sensed occupant weight, crash severity data, etc.

Figure 5:
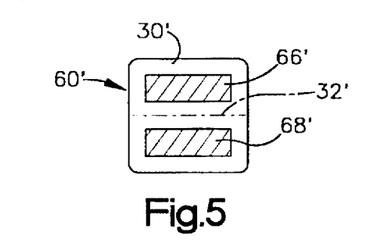
FIG. 5 is a diagram showing capacitor plates for use in the driver's steering wheel in accordance with an alternative embodiment of the present invention.

FIG. 5 illustrates another embodiment of the present invention. In accordance with this embodiment, two capacitor plates 66', 68' of variable capacitor 60' are located on opposite sides of a tear seam 32' of a steering wheel air bag cover 30'. The operating function of the capacitor 60' is the same as described above. The capacitor plates 66' and 68' could be horn switch contacts located in the vehicle steering wheel so that the horn contacts serve two purposes. When the horn switch contacts are depressed, the horn is energized. When the horn switch contacts are not depressed, they function as the capacitive sensor. The horn contacts may be membrane switches, piezo films, force sensing films, etc.

Figure 6:
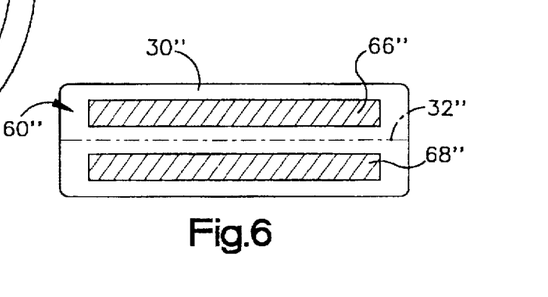
FIG. 6 is a diagram showing capacitor plates for use in a passenger's side air bag restraint in accordance with another embodiment of the present invention.

FIG. 6 illustrates yet another embodiment of the present invention for use with a passenger's side air bag. In accordance with this embodiment, two capacitor plates 66", 68" of variable capacitor 60" are located on respective sides of a tear seam 32" of a passenger's side air bag cover 30". The operating function of the capacitor 60" is the same as described above.

Figure 6A:
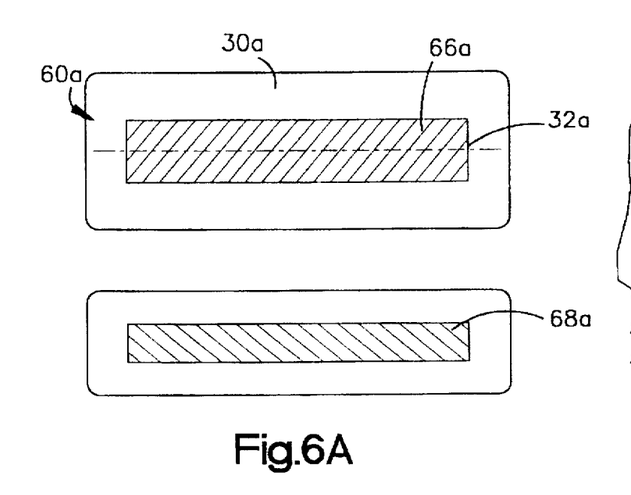
FIGS. 6A and 6B are schematic diagrams showing capacitor plates for use in a passenger's side air bag restraint in accordance with a further embodiment of the present invention.
Figure 6B:
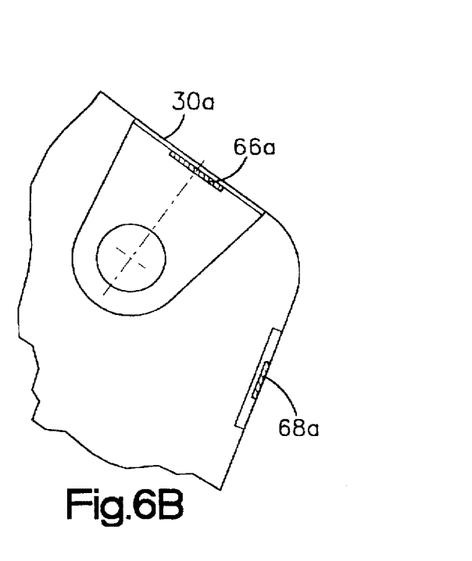

Referring to FIGS. 6A and 6B, another embodiment for a passenger's side restraint is illustrated. In accordance with this embodiment, a passenger's side air bag includes one capacitor plate 66a secured to the back of the air bag cover 30a. The plate 66a has a tear seam aligned with tear seam 32a. The cover 32a could be a hinged cover as is known in the art, in which case, there would be no tear seam. The second capacitor plate 68a would be mounted at a different spaced apart location in the dash or instrument panel.

Figures 7, 8:
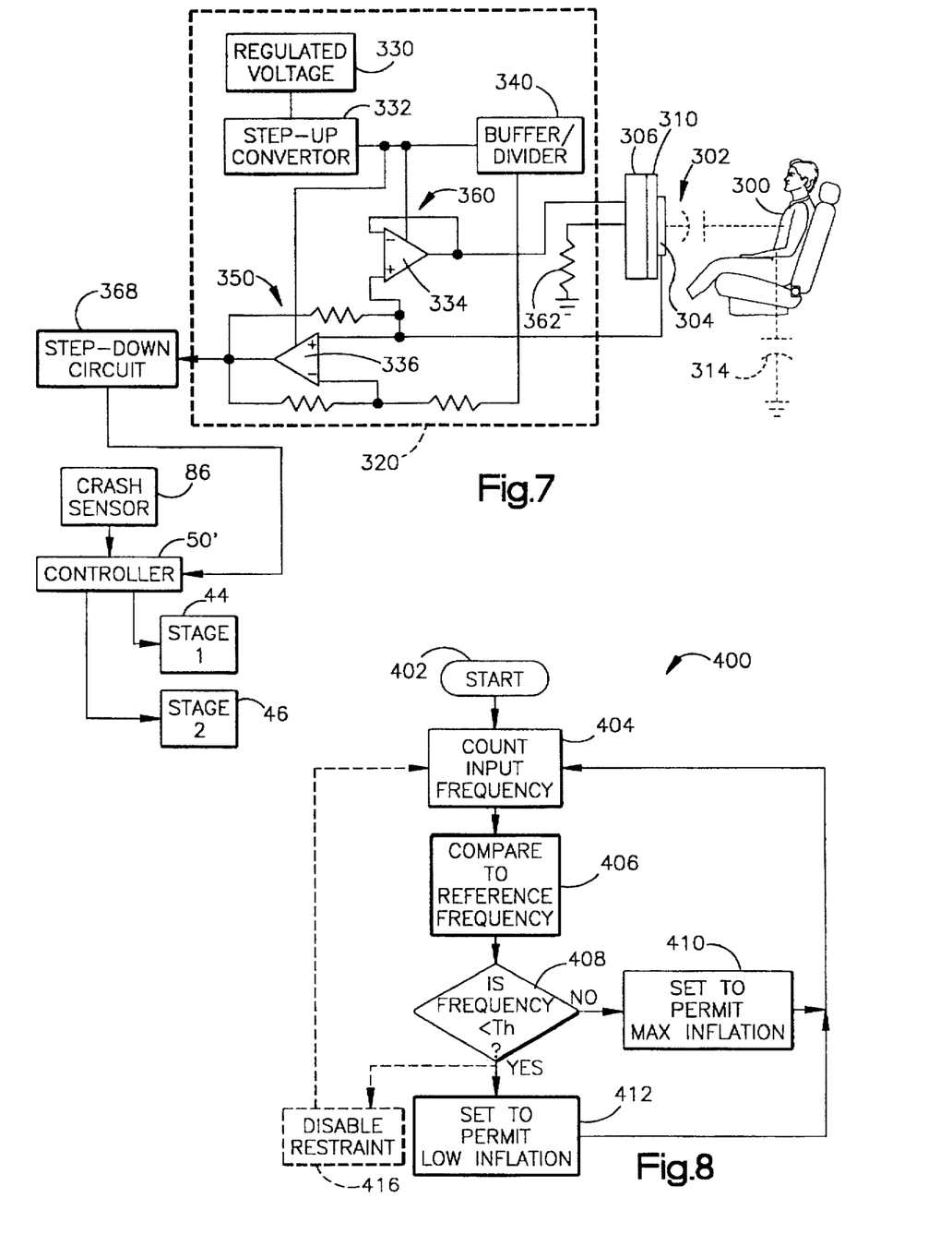
FIG. 7 is a schematic diagram of a control circuit similar to FIG. 3 showing an alternative embodiment of the present invention.
FIG. 8 is a flow chart diagram showing a process for controlling a portion of the system of FIG. 7.

FIG. 7 illustrates still another embodiment of the present invention. This embodiment can be used with either a driver's side restraint or a passenger's side restraint. In accordance with this embodiment, a vehicle occupant 300 effectively functions as one of the capacitor plates of a variable capacitor 302 comprising capacitor plate 304 and the occupant 300. Instead of varying the dielectric to vary capacitance as described in the embodiments above, capacitance is varied by varying the distance between effective capacitor plates.

The capacitor plate 304, also referred to as a capacitance sensing electrode, is mounted to a conductive shield 306 with an insulating layer 310 sandwiched between the capacitor plate and the shield. The occupant is capacitively coupled to the vehicle ground schematically shown as an effective capacitor 314. The capacitance value of 314 is a relatively fixed value. A sufficient electrical communication exists between the occupant 300 and the capacitance sensing electrode 304 that the occupant 300 and electrode 304 form a variable effective capacitor 302. The capacitance value of capacitor 302 is functionally related to the distance between the occupant 300 and the capacitance sensing electrode 304.

It is contemplated that the capacitance sensing electrode 304 and shield 306 will be formed as part of the air bag assembly associated with the occupant 300 in a similar manner as described above. Preferably, these components will be made from conductive foil materials that will permit easy tearing during air bag inflation.

A drive/monitor circuit 320 is operatively connected to the shield 306 and the capacitance sensing electrode 304. The drive/monitor circuit 320 measures the value of the effective capacitor 302 which is, in turn, indicative of the distance between the occupant 300 and the electrode 304, i.e., the air bag assembly. The drive/monitor circuit 320 outputs a signal to controller 50' having a value indicative to the monitored capacitance value. The drive/monitor circuit 320 could be used to drive the capacitors for both the driver's side and passenger's side using appropriate switching circuitry. The controller 50' would set internal flags associated with igniters of a capacitor being monitored.

Drive/monitor circuit 320 includes a regulated voltage source 330 operatively connected to the vehicle battery (not shown). The output of the voltage regulator 330 is connected to a step-up converter 332. An increased voltage level is needed to increase the ability to sense an occupant at a relatively greater distance, e.g., a distance further than one inch away. The output of the step-up converter 332 is used to power two operational amplifiers 334, 336 of the drive/monitor circuit 320. The output of the step-up converter 332 is also connected to a buffer/divider circuit 340. The buffer/divider circuit 340 is a voltage dividing resistor network that is buffered with a voltage follower. The buffer/divider circuit 340 is used in the drive/monitor circuit 320 to permit an oscillator circuit 350 to have an output signal with a symmetrical swing about a zero output.

The capacitance sensing electrode 304 and shield 306 are driven with an RC oscillator circuit 350. The capacitance sensing electrode 304 and occupant 300 function as a variable effective capacitor in the RC oscillator circuit 350. The components of the RC oscillator circuit 350 are selected to provide an oscillation preferably in the range of 20–100 kHz. The shield 306 is driven at the same voltage as the capacitance sensing electrode 304 through a voltage follower circuit 360 so as to prevent any differential electrical potential between the shield 306 and electrode 304. The purpose of the shield is to focus the electric field of the capacitance sensing electrode 304, thereby permitting sensing at a greater distance.

The shield 306 is connected to ground through a high impedance resistor 362, e.g., 1–22 Mohms. This high impedance connection allows for charge bleed off from the shield 306 to prevent charge build up or static charge build up on the shield. Not bleeding off the charge on the shield 306 could result in a change in the capacitance value and the circuit setpoint, i.e., center frequency of the oscillator.

The output of the oscillator 350 is connected to controller 50' though a step-down converter 368. The output of the step-down converter 368 is an oscillating signal having a frequency indicative of the distance between the occupant 300 and the capacitance sensing electrode 304, and, in turn, the air bag assembly. The output frequency decreases as the distance between the occupant and the air bag assembly decreases. Preferably, when the occupant 300 is farther than four inches from the air bag assembly, the output of the drive/monitor circuit 320 is 88 kHz. At four inches, the frequency decreases by 2 kHz. At one inch, the frequency decreases by 8 kHz.

Referring to FIG. 8, the control process 400 used by the controller 50' of the FIG. 7 embodiment will be appreciated. This control process assumes a dual stage inflator assembly in which the options are for one or both sources of inflation fluid to be actuated in response to the determined occupant's position relative to the steering wheel. The process starts at step 402 when the vehicle engine is started. In step 402, initial conditions are set, flags set, memory checked, etc., as is well known in the art. The process then proceeds to step 404 where the output frequency from the drive circuit is monitored. In step 406, the monitored frequency value is compared against a predetermined threshold value.

In accordance with one embodiment of the present invention, the controller monitors the capacitance value, i.e., the occupant's position relative to the air bag assembly, and functions as a switch. If the occupant is greater than a predetermined distance, e.g., four inches, from the air bag assembly, maximum inflation level is permitted (both inflation fluid sources are actuated) upon the occurrence of a deployment crash condition. If the occupant is at the predetermined distance or closer, a low inflation level is permitted (only one inflation fluid source is actuated) upon the occurrence of a deployment crash condition. Timing of the actuation of the fluid sources can also be controlled.

As similarly mentioned above with regard to FIG. 3, the sensor 302 can be used to determine if an occupant is present and to disable the air bag if no presence is detected.

The process proceeds to step 408 where a determination is made as to whether the frequency value monitored in step 406 is less than a predetermined threshold value "Th." This threshold value Th is indicative of the occupant being at the predetermined distance from the air bag assembly. If the determination in step 408 is negative, i.e., the occupant's position is farther than the predetermined distance from the air bag assembly, the process proceeds to step 410 where the controller 50' sets an internal flag that will permit maximum inflation to occur should a deployment crash condition be detected. If the determination in step 408 is affirmative, i.e., the occupant's position is equal to or less than the predetermined distance from the air bag assembly, the process proceeds to step 412 where the controller 50' sets an internal flag that will permit low inflation to occur should a deployment crash condition be detected. From either step 410 or step 412, the process loops back to step 404. As will be appreciated, the process shown in FIG. 8 is a continuous process that permits a change in the permissible inflation level of the air bag in response to a change in the occupant's position.

An alternative embodiment is also shown in FIG. 8 for use in an air bag system having only one inflation fluid source. In accordance with this embodiment, inflation will either be permitted if a deployment crash condition occurs or be disabled. If the determination in step 408 is negative, the process proceeds to step 410 where a flag is set that will permit inflation should a deployment crash condition occur. If the determination in step 408 is affirmative, the process proceeds to step 416 where a flag is set that will disable the restraint, i.e., not permit inflation should a deployment crash condition occur. From either step 410 or step 416, the process loops back to step 404.

Those skilled in the art will appreciate that the drive/monitor circuit 320 and the controller 50' can be tuned to be insensitive to smaller parts of the occupant's body, e.g., hands. Preferably, the controller 50' will include a digital filter arrangement to filter out short duration movement of the occupant in front of the steering wheel. This arrangement is meant to filter out such occurrences as an occupant's hand passing in front of the air bag assembly.

The arrangement shown in FIGS. 7 and 8 can also be used in combination with other occupant position sensor arrangements and air bag control arrangements in a similar manner as described above with regard to FIG. 1.

This invention has been described with reference to preferred embodiments. Modifications and alterations may occur to others upon reading and understanding this specification. For example, the specific distances used in describing the present invention are given only for explanation purposes. Those skilled in the art will appreciate that any distances may be used and that the desired distances are dependent upon the vehicle type. It is our intention to include all such modifications and alterations insofar as they come within the scope of the appended claims and the equivalents thereof.

Having fully described the invention, the following is claimed:

1. An apparatus, for detecting a position of an occupant, in an occupant compartment of a vehicle, said apparatus comprising:

a variable capacitor mounted at a position relative to a predetermined reference location within said vehicle, said variable capacitor having spaced apart conductive plates and a dielectric effectively located between said conductive plates, the capacitance value of said variable capacitor varying as a function of the value of said dielectric, the conductive plates being adapted so that an occupant is effectively part of the dielectric, the dielectric value varying as a function of the occupant location relative to the spaced apart conductive plates;

capacitance sensing circuit means for sensing the position of the occupant relative to the reference location by sensing the capacitance value of said variable capacitor and for outputting an electric signal indicative of the sensed capacitance value, said sensed capacitance value being indicative of the occupant's position relative to said reference location; and control means operatively coupled to said capacitance sensing circuit means for generating an electric control signal in response to the electric signal from said capacitance sensing circuit means;

wherein said spaced apart conductive plates also serve switch contacts of a horn switch.

2. The apparatus of claim 1 wherein said control means includes means for disabling an actuatable restraint system when the sensed capacitance value indicates that said occupant is within a predetermined distance of said reference location.

3. The apparatus of claim 1 wherein said apparatus further includes an air bag and said control means includes means for controlling inflation of said air bag in response to the sensed capacitance value.

4. The apparatus of claim 1 wherein said control means includes means for providing an actuatable restraint control signal in response to the occupant's sensed location relative to said reference location.

5. The apparatus of claim 1 wherein at least one of said spaced apart conductive plates are mounted in a vehicle steering wheel.

6. The apparatus of claim 1 wherein at least one of said spaced apart conductive plates is mounted in a vehicle dash board.

7. The apparatus of claim 1 further including an occupant position sensor secured in the occupant compartment for providing an additional indication of occupant position relative to said reference location, said control signal from said control means being responsive to both the signal from said capacitance sensing means and said additional indication of occupant position.

8. An apparatus, for detecting a position of an occupant, in an occupant compartment of a vehicle having an air bag restraining device, said apparatus comprising:

a variable capacitor having an electrode mounted at the location of said air bag restraining device so that the capacitance value of said variable capacitor varies as a function of distance between a side of an occupant facing said air bag restraining device and said air bag restraining device;

capacitance sensing circuit means for sensing the capacitance value of said variable capacitor and outputting an electric signal indicative of the distance between the side of the occupant facing said air bag restraining device and said air bag restraining device in response to the sensed capacitance value; and control means operatively coupled to said capacitance sensing circuit means for generating an electric control signal in response to the distant between the side of the occupant facing said air bag restraining device and said air bag restraining device as sensed by said capacitance sensing circuit means.

9. The apparatus of claim 8 wherein said control means includes means for disabling said air bag restraining device when the sensed capacitance value indicates that an occupant is within a predetermined distance of said air bag restraining device.

10. The apparatus of claim 8 wherein said control means includes means for controlling inflation of said air bag restraining device in response to the sensed capacitance value.

11. The apparatus of claim 8 wherein said capacitance sensing electrode has multiple functions.

12. The apparatus of claim 11 wherein said capacitive sensing electrode also serves as a switch contact of a horn switch.

13. An apparatus, for detecting a position of an occupant, in an occupant compartment of a vehicle, said apparatus comprising:

a variable capacitor mounted at a known reference location within said vehicle, said variable capacitor adapted so as to have a capacitance value that varies as a function of an occupant position relative to the reference location;

capacitance sensing circuit means for sensing the capacitance value of said capacitor and outputting an electric signal indicative of the sensed capacitance value, the sensed capacitance value being indicative of the occupant's position relative to the reference location;

occupant position sensing means for sensing and providing an electric signal indicative of the position of the occupant relative to said reference location; and control means operatively coupled to said capacitance sensing circuit means for verifying said occupant position sensed by the occupant position sensing means with said occupant position indicated by said sensed capacitance value and providing a control signal in response to the verification;

wherein said variable capacitor includes spaced apart conductive plates that serve as switch contacts of a horn switch.

14. The apparatus of claim 13 wherein said occupant position sensing means includes an ultrasonic sensor.

15. The apparatus of claim 13 wherein said control means includes means for providing a disable signal when said capacitance value indicates that said occupant is within a predetermined distance of said reference location.

16. The apparatus of claim 13 wherein said apparatus further includes an air bag and said control means includes means for controlling inflation of said air bag in response to the sensed capacitance value.

17. An apparatus for controlling an actuatable restraint system in response to a sensed occupant seating characteristic, said apparatus comprising:

a variable capacitor mounted at a known reference location within a vehicle, said variable capacitor having a capacitance value functionally related to an occupant seating characteristic;

capacitance sensing circuit means for sensing the capacitance value of said capacitor and outputting an electric signal indicative of the sensed capacitance value; and control means operatively coupled to said capacitance sensing circuit means for controlling an actuatable restraint with a control signal in response to the sensed capacitance value;

wherein said variable capacitor functions as a horn switch.

18. The apparatus of claim 17 wherein the capacitor's dielectric value is functionally related to the occupant's seating characteristic.

19. The apparatus of claim 17 wherein said capacitance sensing circuit means includes an oscillator circuit for providing a signal having a frequency indicative of said capacitance value of said variable capacitor, said control means monitoring said frequency and providing said control signal in response to the monitored frequency value.

20. The apparatus of claim 17 further including a second sensor means for sensing said occupant's seating characteristic, said control means providing said control signal when at least one of said capacitance value and said second sensor means agree on the occupant seating characteristic.

21. A method for detecting an occupant seating characteristic in an occupant compartment of a vehicle relative to an air bag restraining device, said method comprising the steps of:

applying an oscillating voltage to two spaced apart conductive plates;

mounting said conductive plates at a known location relative to said air bag restraining device so that a dielectric value between the plates varies as a function of distance between a side of an occupant facing said air bag restraining device and said air bag restraining device;

sensing the capacitance value of said variable capacitor and outputting an electric signal indicative of the sensed capacitance value, said capacitance value being indicative of the distance between the side of the occupant facing said air bag restraining device and said air bag restraining device; and providing an electric control signal in response to the sensed capacitance value.

22. The method of claim 21 wherein said step of providing the electric control signal includes disabling an actuatable restraint system when the sensed capacitance value indicates that the occupant is within a predetermined distance of said air bag restraining device.

23. The method of claim 21 wherein said step of providing the electric control signal includes controlling inflation of said air bag restraining device in response to the distance between the side of the occupant facing said air bag restraining device and said air bag restraining device.

24. The method of claim 22 wherein said step of providing the electric control signal includes providing an air bag control signal in response to the the distance between the side of the occupant facing said air bag restraining device and said air bag restraining device.

25. A method for detecting an occupant seating characteristic in an occupant compartment of a vehicle, said method comprising the steps of:

mounting a first conductive electrode of a variable capacitor at a location relative to an air bag restraining device, said first conductive electrode forming a capacitance sensing electrode of the variable capacitor so that the capacitance value of the variable capacitor varies as a function of distance between a side of a seated occupant facing said air bag restraining device and said air bag restraining device;

sensing the capacitance value of said variable capacitor and outputting an electric signal indicative of the sensed capacitance value, said sensed capacitance value being indicative of the distance between the side of said seated occupant facing said air bag restraining device and said air bag restraining device; and providing a control signal in response to the distance between the side of said seated occupant facing said air bag restraining device and said air bag restraining device.

26. A method for controlling an air bag restraining device in response to a sensed occupant seating position in an occupant compartment of a vehicle relative to said air bag restraining device, said method comprising the steps of:

mounting a variable capacitor in the vehicle at a known location relative to the air bag restraining device so that its capacitance value is functionally related to distance between a side of a seated occupant facing the air bag restraining device and the air bag restraining device;

sensing the capacitance value of said capacitor and outputting an electric signal indicative of the sensed capacitance value, said sensed capacitance value being indicative of the distance between the side of the the occupant facing the air bag restraining device and the air bag restraining device; and controlling the air bag restraining device in response to the the distance between the side of the seated occupant facing the air bag restraining device and the air bag restraining device.

27. An apparatus, for detecting position of an occupant, in an occupant compartment of a vehicle having an air bag restraining device mounted in the vehicle, said apparatus comprising:

a variable capacitor mounted at a position relative to said air bag restraining device, said variable capacitor having spaced apart conductive plates and a dielectric effectively located between said conductive plates and adapted so that the dielectric value varies as a function of distance between a side of an occupant facing said air bag restraining device and said air bag restraining device;

capacitance sensing circuit means connected to said variable capacitor for sensing the distance between the side of the occupant facing said air bag restraining device and said air bag restraining device by sensing the capacitance value of said variable capacitor and for outputting an electric signal indicative of the distance between the occupant and said air bag restraining device; and control means operatively coupled to said capacitance sensing circuit means for generating an electric control signal in response to the electric signal output from said capacitance sensing circuit means.

28. The apparatus of claim 27 wherein said control means includes means for disabling said air bag restraining device when the sensed capacitance value indicates that the distance between the side of the occupant facing said air bag restraining device and said air bag restraining device is less than a predetermined distance.

29. The apparatus of claim 27 wherein said control means includes means for controlling inflation of said air bag restraining device in response to the sensed capacitance value.

30. The apparatus of claim 27 wherein said control means includes means for providing an actuation signal in response to the sensed capacitance value.

31. The apparatus of claim 27 wherein at least one of said conductive plates of said variable capacitor is mounted to said air bag restraining device.

32. The apparatus of claim 27 wherein at least one of said spaced apart conductive plates of said variable capacitor is mounted in a vehicle steering wheel and said air bag restraining device is mounted in said steering wheel.

33. The apparatus of claim 27 wherein at least one of said spaced apart conductive plates is mounted in a vehicle dash board.

34. The apparatus of claim 27 wherein said space apart conductive plates have multiple functions.

35. The apparatus of claim 32 wherein said spaced apart conductive plates also serve as switch contacts of a horn switch.

36. The apparatus of claim 27 further including an occupant position sensor secured in the vehicle compartment for providing an additional indication of occupant position relative to said air bag restraining device, said control signal from said control means being responsive to both the signal from said capacitance sensing means and said additional indication of occupant position.

37. An apparatus, for detecting position of an occupant, in an occupant compartment of a vehicle having an air bag restraining device mounted in the vehicle, said apparatus comprising:

a variable capacitor mounted at a known reference location relative to said air bag restraining device, said variable capacitor adapted so as to have a capacitance value that varies as a function of distance between a side of an occupant facing said air bag restraining device and said air bag restraining device;

capacitance sensing circuit means for sensing the capacitance value of said capacitor and outputting an electric signal indicative of the sensed capacitance value, the sensed capacitance value being indicative of the distance between the side of the occupant facing said air bag restraining device and said air bag restraining device;

occupant position sensing means for sensing and providing an electric signal indicative of the distance between the side of the occupant facing said air bag restraining device and said air bag restraining device; and control means operatively coupled to said capacitance sensing circuit means for verifying the distance sensed by the occupant position sensing means with the distance indicated by said sensed capacitance value and providing a control signal in response to the verification.

38. The apparatus of claim 37 wherein said occupant position sensing means includes an ultrasonic sensor.

39. The apparatus of claim 37 wherein said control means includes means for providing a disable signal when said capacitance value indicates that said occupant is within a predetermined distance of said air bag restraining device.

40. The apparatus of claim 37 wherein said control means includes means for controlling inflation of said air bag restraining device in response to the sensed capacitance value.

41. The apparatus of claim 37 wherein said variable capacitor includes space apart conductive plates having multiple functions.

42. The apparatus of claim 41 wherein said spaced apart conductive plates also serve as switch contacts of a horn switch.

43. An apparatus for controlling an air bag restraining device in response to a sensed occupant seating position relative to an air bag restraining device, said apparatus comprising:

a variable capacitor mounted at a known location relative to an air bag restraining device within a vehicle, said variable capacitor having a capacitance value functionally related to distance between a side of an occupant facing said air bag restraining device and said air bag restraining device;

capacitance sensing circuit means for sensing the capacitance value of said variable capacitor and outputting an electric signal indicative of the sensed capacitance value; and control means operatively coupled to said capacitance sensing circuit means for controlling said air bag restraining device in response to the sensed capacitance value.

44. The apparatus of claim 43 wherein said capacitance sensing circuit means includes an oscillator circuit for providing a signal having a frequency indicative of said capacitance value of said variable capacitor, said control means monitoring said frequency and providing a control signal in response to the monitored frequency value.

45. The apparatus of claim 43 further including a second sensor means for sensing distance between the side of the occupant facing said air bag restraining device and said air bag restraining device, said control means providing a control signal when said capacitance value and said second sensor means agree on the distance between the side of the occupant facing said air bag restraining device and said air bag restraining device.

46. The apparatus of claim 45 wherein said variable capacitor functions as a horn switch.

47. An apparatus, for detecting position of an occupant, in an occupant compartment of a vehicle, relative to an associated occupant air bag restraining device, said apparatus comprising:

a variable capacitor having spaced apart conductive plates with a first of said conductive plates of said variable capacitor mounted to an air bag restraining device so that a capacitance value of the variable capacitor is functionally related to distance between a side of a vehicle occupant facing said air bag restraining device and said air bag restraining device; and capacitance sensing circuit means for sensing the capacitance of said variable capacitor and for outputting an electric control signal in response thereto.

48. The apparatus of claim 47 wherein said spaced apart plates of said variable capacitor are mounted on respective sides of a cover tear seam of said air bag restraining device.

49. The apparatus of claim 48 wherein said air bag restraining device is mounted in a vehicle steering wheel.

50. The apparatus of claim 48 wherein said air bag restraining device is mounted in a vehicle dash board.

51. The apparatus of claim 47 wherein the air bag restraining device is mounted in a hub of a vehicle steering wheel and a second of said spaced apart plates of said variable capacitor is mounted in a steering wheel ring.

52. The apparatus of claim 47 further including means to capacitively couple the occupant to a ground system of the vehicle so as to capacitively couple the occupant with said first of said conductive plates mounted to said air bag restraining device, the capacitance value of said variable capacitor being functionally related to the distance between the side of the occupant facing said air bag restraining device and said first of said conductive plates mounted to said air bag restraining device.

53. An apparatus for detecting position of an occupant in an occupant compartment of a vehicle relative to an air bag restraining device operatively mounted in said vehicle compartment, said apparatus comprising:

a variable capacitor having spaced apart conductive plates mounted relative to an air bag restraining device so that an occupant is not physically located between said spaced apart conductive plates when the occupant is seated in a seat and the capacitance value of said variable capacitor varies as a function of distance between a side of the occupant facing said air bag restraining device and said air bag restraining device; and capacitance sensing circuit means for sensing the capacitance value of said variable capacitor and for providing an air bag control signal in response to the sensed capacitance value.

54. The apparatus of claim 53 wherein said spaced apart plates of said variable capacitor are mounted on respective sides of a cover tear seam of said air bag restraining device.

55. The apparatus of claim 53 wherein said air bag restraining device is mounted in a vehicle steering wheel.

56. The apparatus of claim 53 wherein said air bag restraining device is mounted in a vehicle dash board.

57. The apparatus of claim 53 wherein a first of said conductive plates is mounted to the air bag restraining device which is mounted in a hub of a vehicle steering wheel and wherein a second of said conductive plates of said variable capacitor is mounted in a steering wheel ring.

58. An apparatus for detecting position of an occupant in an occupant compartment of a vehicle, said apparatus comprising:

a variable capacitor having a capacitance sensing electrode mounted at a reference location so that the capacitance value of said variable capacitor varies as a function of an occupant location relative to the reference location;

capacitance sensing circuit means for sensing the capacitance value of said variable capacitor and outputting an electric signal indicative of the occupant's position relative to the reference location in response to the sensed capacitance value; and control means operatively coupled to said capacitance sensing circuit means for generating an electric control signal in response to the sensed position of the occupant relative to the reference location as sensed by said capacitance sensing circuit means;

wherein said variable capacitor also serves as a horn switch.

* * * * *

UNITED STATES PATENT AND TRADEMARK OFFICE
CERTIFICATE OF CORRECTION

PATENT NO. : 5 722 686
DATED      : March 3, 1998
INVENTOR(S) : Brian K. Blackburn, Scott B. Gentry, Joseph F. Mazur, Charles E. Steffens, Jr., John E. Bessonen and William M. Jarocha It is certified that error appears in the above-indentified patent and that said Letters Patent is hereby corrected as shown below:

Column 11, line 67, change "distant" to --distance--.

Column 13, line 46, change "22" to --21--.

Column 14, line 17, change "the" (fourth occurence) to --seated--.

Signed and Sealed this

Twenty-second Day of September, 1998

Attest:

BRUCE LEHMAN

Attesting Officer        Commissioner of Patents and Trademarks